March 23, 1965 P. G. DE SEE ETAL 3,174,501
VALVE AND VALVE MOUNTING
Filed Sept. 7, 1962
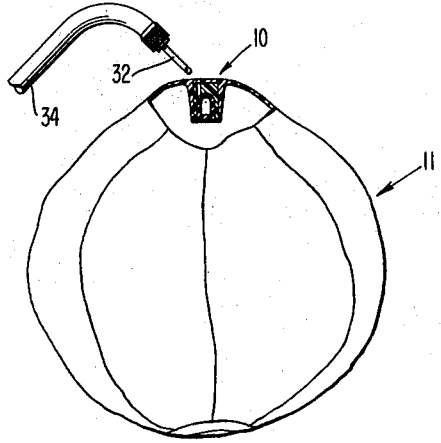
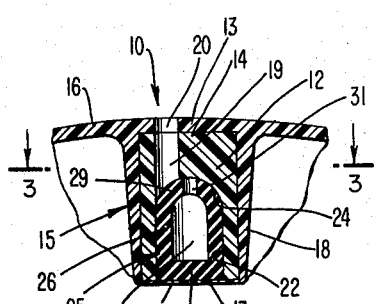
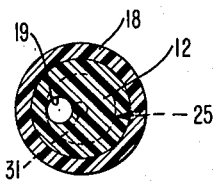
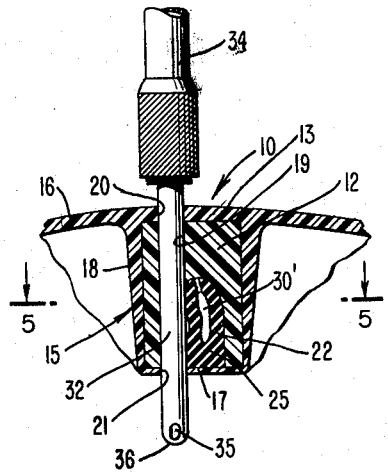
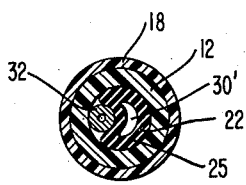
INVENTORS
PETER G. DE SEE
GEORGE E. LARDNER
BY
Alfred W. Vibber
ATTORNEY United States Patent Office 3,174,501
Patented Mar. 23, 1965

3,174,501
VALVE AND VALVE MOUNTING
Peter G. De See, Hawthorne, and George E. Lardner, Paramus, N.J., assignors to Halkey-Roberts Corporation, Paramus, N.J., a corporation of New Jersey
Filed Sept. 7, 1962, Ser. No. 222,120
12 Claims. (Cl. 137—223)

This invention relates to a valve and to a mounting therefor. In preferred embodiments the invention relates to a valve of the inserted needle actuated type, which is adapted for the inflation and deflation of inflatable articles, and to the combination of such valve with an object, such as an inflatable article, with which the valve is operatively associated.

The invention has among its objects the provision of a novel valve of the needle actuated type, such valve being characterized by the ease of insertion of the needle during actuation of the valve, and by the speed of closing of the passage through the valve upon withdrawal of the needle from the valve.

A further object of the invention is the provision of a valve of the type indicated wherein the outer valve body may be made of a variety of materials depending upon the application of the valve and the character of the material to which it is to be joined, including materials less elastomeric than rubber and, if desired, materials which are substantially rigid.

Another object of the invention is the provision of a valve of the needle actuated type which may readily be heat sealed to an object having a valve mounting portion made of plastic material, as by being substantially encapsulated in a portion of the sidewall of an inflatable article having a wall made of plastic material, without damage to any part of the valve.

Yet another object of the invention is the provision of a valve having a passage therethrough and passage-sealing members wherein the engaging surfaces of said passage-sealing members are made of unlike materials whereby bonding of such surfaces is avoided when the valve is heated as during its curing and/or the formation of a cast encapsulation about it.

Still other objects of the invention are the provision of a novel valve of the indicated type which is simple in construction, which is economical to make, which has a long service life, and which forms a secure, leak-proof seal when it is closed by the withdrawal of the needle.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view partially in elevation and partially in vertical section through an inflatable ball in a partially inflated condition, an inflating needle being shown about to be inserted in the illustrative embodiment of a valve incorporated in the ball;

FIG. 2 is a view in vertical axial section through the closed valve of FIG. 1 and through an encapsulation integral with the wall of the ball which substantially surrounds and encloses the valve;

FIG. 3 is a view in transverse section through the valve and valve encapsulation of FIG. 2, the section being taken along the line 3—3 of FIG. 2;

FIG. 4 is a view in vertical axial section through the valve with an inflation needle inserted therein, the valve thus being in its open condition, the inflation needle and the hose to which it is attached being shown in elevation; and FIG. 5 is a view in transverse section through the valve and inflation needle of FIG. 4, the section being taken along the line 5—5 of FIG. 4.

The valve of the invention is shown herein as being an air inflation valve for an inflatable article, the valve being sealed to the article by being encapsulated in a portion of the wall of the article It is to be understood, however, that the valve may be employed to advantage in a number of different applications wherein it selectively conducts fluids such as various liquids and gases therethrough or seals against the passage of such fluids, and that the valve may be mounted upon and sealed to a number of different supporting members, within the scope of the invention, such members being intimately or remotely associated with a fluid conducting or containing article.

Turning now to the drawings, an illustrative embodiment of valve in accordance with the invention, generally designated by the reference character 10, is shown in FIG. 1 incorporated in an inflatable ball 11. In FIG. 1 ball 11 is shown in partially inflated condition, and about to be further inflated by the insertion of an inflating needle 32 into the valve and the introduction of gas such as air into the ball through the hose 34 to which the inflation needle is attached. When the needle is withdrawn from the valve, as shown in FIGS. 1, 2 and 3, the valve is automatically closed to seal the passage therethrough. When the needle is inserted in the valve, as shown in FIGS. 4 and 5, there is provided a path through the needle for the passage of fluid into and out of the ball 11, depending upon the relative pressures of the fluid at the inner and outer ends of the passage through the needle.

The valve 10 has a body 12 which in the embodiment shown has a circular cylindrical external configuration, the body 12 being positioned with its longitudinal axis extending substantially radially of the ball 11. The outer end surface 14 of valve body 12 is disposed generally tangent to the inner surface of the wall 16 of the ball, being enclosed or encapsulated in an encapsulation 15 which is integral with wall 16 of the ball. The encapsulation thus has an outer sheet-like layer 13 overlying the valve body; it also has a sidewall 18 intimately surrounding the valve body, and a thin inner sheet-like layer 17 overlying the inner end of the valve body.

The valve body 12 may be made of a number of different materials. These may range, for example, from materials which are rigid or substantially rigid to those which have substantial resilience but are relatively hard, such as rubber or rubber-like materials having a hardness on the Shore A durometer scale on the order of 75. In preferred embodiments, body 12 is molded of relatively inflexible plastic material, such as vinyl polymers and copolymers and polyethylene. It is advantageous to make body 12 of a thermoplastic resin which has a composition which is the same as that of the wall 16 of the article 11 when the wall 16 and encapsulation 15 are formed by casting molten resin, since the encapsulation then partially melts the outer surface of body 12 and forms a strong integral bond therewith.

The valve body 12 has a longitudinally extending circular cylindrical needle-receiving passage 19 therein parallel to but substantially offset laterally from the longitudinal axis of the body. The outer end portion 13 and the inner end portion 17 of the encapsulation 15 have passages 20 and 21 therethrough aligned with and of substantially the same diameter as passage 19. The passages 19, 20, and 21 are of such diameter as accurately to receive the circular cylindrical forward or inner end of an inflation needle 32, as shown in FIGS. 4 and 5.

Extending from the inner end of valve body 12 is a central cavity 22 which is circular cylindrical throughout the greater portion of its length from the inner end of body 12, the end 24 of the cavity intermediate the length of the body 12 being generally in the shape of a part of a sphere having its center on the common longitudinal axes of valve body 12 and cavity 22.

Compressively received within cavity 22 is a relatively soft resilient valve member 25 having a relaxed shape which is substantially complementary to or the same as but somewhat larger than that of cavity 22. When the valve member 25 is mounted in valve body 12, as shown in FIG. 2, the cylindrical sidewall and rounded end wall of the valve member sealingly engage the confronting surfaces of the cavity 22. Valve member 25 may be made, for example, of rubber or rubber-like material having a hardness on the order of 40 on the Shore A durometer scale. The cavity 22 is of such diameter that it intersects passage 19 in the valve body 12, the portion of passage 19 lying within the cavity having one longitudinal (geometrical) element thereof common to it and the cavity.

The valve member 25 has a cavity 30 therein, such cavity having a shape substantially similar to that of the valve member and disposed generally symmetrically therewithin. Thus the valve member has a sidewall 26, a flat wall 27 at the inner end of body 12, and a rounded end wall 29 at its end inwardly of the body, all of such walls being of substantially the same thickness. Such thickness is not substantially less than the diameter of passage 19, as shown. The rounded end wall 29 of valve member 25 has an axial passage 31 therein extending inwardly to cavity 30, the outer end of passage 31 underlying and sealingly engaging a portion of the rounded surface 24 of cavity 22 when the valve is in closed position, as shown in FIG. 2.

When the ball 11 is to be inflated, a needle 32 is inserted into the passages 20, 19, and 21 until the inner end of the needle extends into the interior of the ball, as shown in FIG. 4. The rounded forward end 36 of the needle first encounters the rounded end of the valve member at a position somewhat offset from the axis thereof, and thus tends to cam the upper end of the valve member laterally away from the passage 19, without subjecting the valve member to sufficient axially directed thrust to tend to dislodge it from cavity 22. The rounded forward end of the needle 32 thus finds its way as the needle is progressively inserted into valve 10, along the now open interface between the valve member 25 and the surface of passage 19.

Such action causes the valve member 25 to be laterally compressed and deformed, as shown in FIG. 4. The valve member 25, however, particularly at zones thereof at and near its rounded end wall 29 and its flat end wall 27, at all times make firm sealing contact with the circular cylindrical forward end portion of the needle. The passage 31 in the valve member permits air within cavity 30 to flow out of the cavity as the outer end of passage 31 is relieved from contact with surface 24 of the valve body upon deformation of the valve member by insertion of the needle. The valve member is thus readily deformed, and permits the easy insertion of the needle.

After the needle has been inserted into the valve as shown in FIG. 4, air under pressure is introduced into hose 34 and thence through the bore of the inflation needle and outwardly of the bore through one or more openings 35 into the interior of the ball 11. When the ball has been inflated to the desired extent, the needle 32 is withdrawn from the valve 10. During withdrawal of the needle, the valve member 25 maintains sealing engagement with the needle and the wall of cavity 22, thereby preventing the escape of any of the gas contents of the ball. During such withdrawal of the inflation needle, the rounded end of the valve member will be momentarily disturbed from its sealing engagement with the rounded wall 24 of cavity 22 sufficiently to allow the ingress of air through passage 31 into the cavity 30 in the valve member 25. This permits the free expansion of the valve member so that it almost instantly regains the shape thereof shown in FIG. 2 when the inflation needle is fully withdrawn from the valve.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art. It is also to be understood that the encapsulation 15 and its manner of formation are capable of variation within the scope of the invention. Thus such encapsulation may be formed initially with passage 21 in the inner layer 17 thereof. Preferably, however, for reasons of simplicity and economy in the making of the encapsulation, the layer 17 is made as an imperforate layer in the formation of the encapsulation. With such manner of formation of the encapsulation, the passage 21 is formed upon the first insertion of the needle 32 into the valve, the forward end of the needle then punching or locally tearing the passage 21 in the layer 17.

What is claimed is:

1. A self-sealing valve adapted for the needle inflation of inflatable objects, comprising a substantially rigid valve body adapted to be sealingly connected to the wall of an inflatable hollow object, said body having a cavity of substantial size therein, a needle-receiving passage extending through the body from the outer to the inner end thereof, said passage intersecting the cavity in the valve body and being offset substantially radially from the axis of the cavity, and a resilient valve member which is substantially softer than the valve body and is compressively and sealingly retained in the cavity in the body, said valve member extending across and sealing the passage through the body in the absence of an inflating needle in the passage through the valve body, said passage through the valve body being sealed solely by the valve member, upon the insertion of an inflating needle into the passage in the valve body, the valve body remaining substantially undistorted and the valve member being distorted and pushed away from the wall of said passage at the location of the needle.

2. A self-sealing valve adapted for the needle inflation of inflatable objects, comprising a rigid valve body adapted to be sealingly connected to the wall of an inflatable hollow object, said body having a cavity of substantial size therein, a needle-receiving passage extending through the body from the outer to the inner end thereof and adapted selectively to provide communication between the interior of a hollow object to which the valve is to be sealed and the atmosphere, said passage intersecting the cavity in the valve body and being offset substantially radially from the axis of the cavity, and a thin walled hollow collapsible valve member made of resilient plastic material which is substantially softer than the valve body and is compressively and sealingly retained in the cavity in the body, said valve member extending across and sealing the passage through the body in the absence of an inflating needle in the passage through the valve body, said passage through the valve body being sealed solely by the valve member, upon the insertion of an inflating needle into the passage in the valve body, the valve body remaining undistorted and the valve member being partially collapsed and pushed away from the wall of said passage at the location of the needle.

3. A valve as defined in claim 2, wherein the valve body has a seat on the wall of the cavity therein, said seat being located adjacent the passage through the valve body, the valve member has an opening through the wall thereof, the outer end of the opening through the wall of the valve member engaging the outer surface of the valve body at a zone thereof which sealingly cooperates with the seat on the wall of the cavity in the absence of an inflating needle in the passage through the valve body.

4. A valve as defined in claim 3, wherein the wall of the valve member is imperforate except for said opening therethrough, the opening in the valve member has its outer end disposed adjacent the passage in the valve body, the parts being so constructed and arranged that the insertion of an inflating needle in the passage through the valve body and the presence of such needle in the passage causes the valve member at least partially to withdraw from the seat on the wall of the cavity at the zone of the outer end of the opening through the wall of the valve member to release the pressure of air within the valve member caused by the partial collapse of the valve member by the presence of the inflation needle in the passage through the valve body.

5. A valve as defined in claim 2, wherein the cavity in the valve body is rounded in shape at the end thereof nearer the outer end of the valve body, the valve member has a shape which is substantially complementary to the shape of the cavity, and the passage in the valve body through the cavity therein has one side thereof lying substantially tangent to one side of the cavity, whereby an inflation needle inserted into the outer end of the passage through the valve body first engages the rounded outer end of the valve member and then causes the valve member to be progressively cammed and thrust away from the passage upon further travel of the needle inwardly of such passage.

6. A valve as defined in claim 2, wherein the passage through the valve body lies within and at least substantially tangent at one side thereof to the sidewall of the cavity in the body at the zone of intersection between the passage and the cavity.

7. A valve as defined in claim 6 wherein the valve member has a portion of its outer surface which extends across and seals the zone of intersection between the cavity and the outer end portion of the passage.

8. A valve as defined in claim 7, wherein the surface of the cavity at the end of the cavity adjacent the outer end of the valve body is concavely rounded in a direction from the outer to the inner end of the valve body, and wherein the valve member has a complementarily rounded surface sealingly engaging said concavely rounded surface of the cavity, the surface of the valve member which underlies the inner end of the portion of the passage outwardly of the cavity curving inwardly toward the inner end of the valve body in a direction diametrically of the passage toward the side of the cavity to which the passage lies tangent.

9. A valve as defined in claim 8, wherein the valve member has a wall of substantial thickness, the thickness of the wall of the valve member at the zone thereof which crosses and seals the passage in the valve body in the absence of an inflating needle in the passage substantially exceeding the diameter of the passage.

10. A self-sealing valve adapted for the needle inflation of inflatable objects, comprising a substantially rigid valve body adapted to be sealingly connected to the wall of an inflatable hollow object, said body having a cavity of substantial size therein, a needle-receiving passage extending through the body from the outer to the inner end thereof and adapted selectively to provide communication between the interior of the hollow object to which the valve is sealed and the atmosphere, said passage intersecting the cavity in the valve body, the valve body having a seat on the sidewall of the cavity therein, said seat being located adjacent the passage through the valve body, and a hollow resilient valve member made of relatively soft resilient plastic material compressively and sealingly retained in the cavity in the body and extending across and sealing the passage through the body in the absence of an inflating needle in the passage through the valve body, the valve member being pushed away from the passage upon the insertion of an inflating needle thereinto, the valve member having a wall which is imperforate except for one opening therethrough, the outer end of the passage opening through the sidewall of the valve member engaging the outer surface of the valve body at a zone thereof which sealingly cooperates with the seat on the sidewall of the cavity in the absence of an inflating needle in the passage through the valve body.

11. A valve as defined in claim 10, wherein the opening through the wall of the valve member has its outer end disposed adjacent the passage in the valve body, the parts being so constructed and arranged that the insertion of an inflating needle in the passage through the valve body and the presence of such needle in the passage causes the valve member at least partially to withdraw from the seat on the wall of the cavity at the zone of the outer end of the opening through the wall of the valve member to release the pressure of air within the valve member caused by the partial collapse of the valve member by the presence of the inflation needle in the passage through the valve body.

12. A self-sealing valve adapted for the needle inflation of inflatable objects, comprising a substantially rigid valve body adapted to be sealingly connected to the wall of an inflatable hollow object, said body having a cavity of substantial size therein, the inner end of the cavity being open, a needle-receiving passage extending through the body from the outer to the inner end thereof, said passage intersecting the cavity in the valve body and being offset substantially radially from the axis of the cavity, and a resilient valve member which is substantially softer than the valve body and is compressively and sealingly retained in the cavity in the body, said valve member extending across and sealing the passage through the body in the absence of an inflating needle in the passage through the valve body, and means connected to the valve body and overlying the inner end of the valve member for retaining the valve member in the cavity.

References Cited by the Examiner

UNITED STATES PATENTS

| 1,974,378 | 9/34 | Nicoll | 137—223 |
| 2,183,900 | 12/39 | Voit et al. | 137—223 |
| 3,118,672 | 1/64 | Dorn | 137—223 |

FOREIGN PATENTS

| 500,643 | 1939 | Great Britain. |
| 274,275 | 6/51 | Switzerland. |

RICHARD C. PINKHAM, *Primary Examiner*.